(No Model.)

J. LITTLEJOHN.
STRAINER.

No. 599,617. Patented Feb. 22, 1898.

WITNESSES:
M. D. Blondel
P. B. Turpin

INVENTOR
John Littlejohn
BY Munn & Co.
ATTORNEYS.

UNITED STATES PATENT OFFICE.

JOHN LITTLEJOHN, OF AURORA, ILLINOIS.

STRAINER.

SPECIFICATION forming part of Letters Patent No. 599,617, dated February 22, 1898.

Application filed June 2, 1897. Serial No. 639,192. (No model.)

*To all whom it may concern:*

Be it known that I, JOHN LITTLEJOHN, of Aurora, in the county of Kane and State of Illinois, have invented a new and useful Improvement in Strainers, of which the following is a specification.

My invention is an improvement in milk-strainers, and seeks to provide a simple form of strainer in which the milk may be efficiently strained and in which sediment-chambers will be supplied to facilitate straining and to permit the use of a finer-meshed straining-cloth than is ordinarily used.

The invention consists in certain novel constructions, combinations, and arrangements of parts, as will be hereinafter described, and pointed out in the claims.

Figure 1:
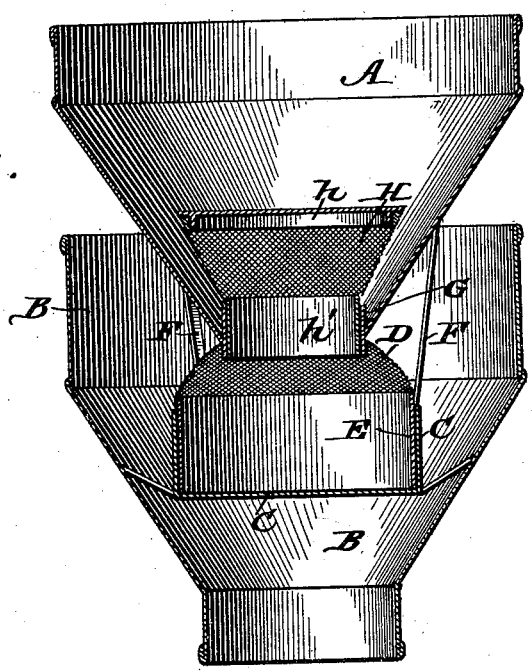
Figure 2:
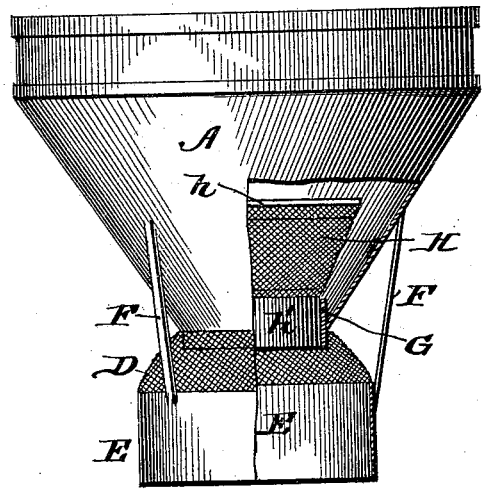
Figure 3:
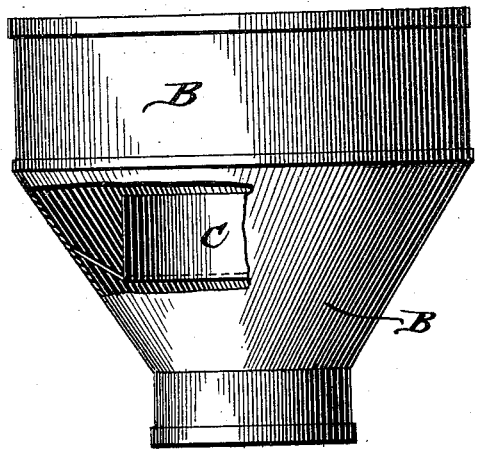

In the drawings, Figure 1 is a vertical longitudinal section of my strainer. Fig. 2 is a detail side view of the upper funnel, the latter being broken away to show the upper strainer. Fig. 3 is a detail view of the lower funnel.

In carrying out my invention I employ an upper funnel A, forming a hopper, and a lower funnel B. This funnel B has a cup-like receiver C, which forms a sediment-chamber for the lower strainer D, which depends from the upper funnel A. The strainer D is connected directly with the lower end of the funnel A and has at its lower end a ring E, which fits in the cup or seat C and may be braced and steadied by the stay-rods F, as shown.

Within the upper funnel A, at the lower end thereof, I form a nipple or seat G for the upper strainer H, which latter is in the shape of an inverted truncated cone having a removable cap or top $h$ and provided at its lower end with a ring $h'$, fitting the seat G in the funnel A.

The parts are so constructed and assembled that the strainer may be readily taken to pieces and thoroughly and quickly cleaned. The milk poured into the funnel A will find a sediment-chamber below and surrounding the strainer H, through which the milk will be strained and will pass down to the cup C and the lower strainer D. This cup C, being below the strainer D, will form a sediment-chamber for the latter, and the milk will strain through the strainer D. It will be seen that I provide sediment-chambers for each strainer.

It will also be noticed that the strainers are inverted or inclined above the sediment-chambers and that the tendency of the milk passing upward through said inclined strainer is to discharge all dirt, &c., into the sediment-chambers below.

Having thus described my invention, what I claim as new, and desire to secure by Letters Patent, is—

1. An apparatus substantially as described comprising the upper funnel forming the hopper provided at its lower end with the depending strainer having a ring at its lower end, the lower funnel having a cup-like receiver forming a seat for said ring and a sediment-chamber below the strainer, the nipple-like seat in the upper funnel and the strainer fitted thereto substantially as described.

2. An apparatus substantially as described comprising the upper funnel, a strainer connected with the lower end of said funnel, an open-bottomed ring at the lower end of said strainer and connected by the latter with the upper funnel, the lower funnel having a cup into which said ring fits, the upper funnel being provided with a strainer above the said connecting-strainer substantially as described.

3. An apparatus substantially as described comprising the lower funnel, a cup within said funnel and arranged to discharge at its upper end into said lower funnel, the upper funnel arranged to discharge into said cup and having its discharge-opening of less diameter than said cup and the strainer surrounding the upper end of the cup substantially as described.

4. An apparatus substantially as described consisting of the lower section, a cup supported thereon, the upper section having at its lower end a depending strainer, a ring supported by said strainer and fitting in the cup of the lower section, a nipple in the upper section and the upper strainer fitted to said nipple substantially as described.

JOHN LITTLEJOHN.

Witnesses:
H. L. KRAHL,
I. R. CHATTLE.